(12) United States Patent
Wenning et al.

(10) Patent No.: US 6,825,240 B2
(45) Date of Patent: Nov. 30, 2004

(54) RADIATION CURABLE POWDER COATING COMPOSITIONS AND THEIR USE

(75) Inventors: Andreas Wenning, Nottuln (DE); Giselher Franzmann, Witten (DE); Emmanouil Spyrou, Marl (DE)

(73) Assignee: Degussa AG, Duesseldorf (DE)

( * ) Notice: Subject to any disclaimer, the term of this patent is extended or adjusted under 35 U.S.C. 154(b) by 11 days.

(21) Appl. No.: 10/321,384

(22) Filed: Dec. 18, 2002

(65) Prior Publication Data
US 2003/0130372 A1 Jul. 10, 2003

(30) Foreign Application Priority Data
Dec. 22, 2001 (DE) .......................... 101 63 827

(51) Int. Cl.[7] .................. C08G 18/00; C09D 5/03
(52) U.S. Cl. .................. 522/90; 522/96; 522/81; 522/83; 528/65; 528/66
(58) Field of Search .............. 522/90, 96, 81, 522/83; 528/65, 66

(56) References Cited

U.S. PATENT DOCUMENTS

| 4,895,895 | A | * | 1/1990 | Osborne et al. ............... 525/28 |
| 4,973,646 | A | * | 11/1990 | Witzeman et al. ............. 528/45 |
| 5,373,084 | A | * | 12/1994 | Chang ......................... 528/272 |
| 5,620,751 | A | * | 4/1997 | Brindoepke et al. ........ 427/506 |
| 5,922,473 | A | * | 7/1999 | Muthiah et al. ............. 428/481 |
| 6,136,882 | A | * | 10/2000 | Daly et al. ................... 522/107 |
| 6,184,311 | B1 | * | 2/2001 | O'Keeffe et al. ........... 525/438 |
| 6,380,279 | B1 | * | 4/2002 | Moens et al. ................ 522/111 |
| 6,384,102 | B1 | * | 5/2002 | Moens et al. ................ 522/110 |
| 6,555,597 | B1 | * | 4/2003 | Weikard et al. ............. 522/174 |
| 2003/0125456 | A1 | * | 7/2003 | Wenning et al. ............. 524/589 |

FOREIGN PATENT DOCUMENTS

| EP | 0 408 465 | 1/1991 |
| EP | 1 129 788 | 9/2001 |
| EP | 1 209 182 | 5/2002 |
| WO | WO 98/55554 | 12/1998 |
| WO | WO 02/50147 | 6/2002 |

* cited by examiner

*Primary Examiner*—Susan Berman
(74) *Attorney, Agent, or Firm*—Oblon, Spivak, McClelland, Maier & Neustadt, P.C.

(57) ABSTRACT

A radiation curable powder coating composition, comprising I.) a binder comprising A) 60–90% by weight of at least one amorphous urethane acrylate; and B) 10–40% by weight of at least one crystalline urethane acrylate; wherein a Tg of a mixture of A) and B) is at least 35° C.; and II.) an auxiliary and an additive, excluding an UV initiator, crosslinks to yield a lightfast and weather-stable film.

25 Claims, No Drawings

RADIATION CURABLE POWDER COATING COMPOSITIONS AND THEIR USE

BACKGROUND OF THE INVENTION

1. Field of the Invention

The present invention relates to a radiation curable powder coating composition which crosslinks to form a lightfast and weather-stable film.

2. Discussion of the Background

Thermally crosslinkable powder coating materials are known and are much used in the paint processing industry.

For example, DE-C 27 35 497 describes PU powder coatings having outstanding weathering stability and heat stability. The crosslinkers whose preparation is described in DE-C 27 12 931 are composed of ε-caprolactam-blocked isophorone diisocyanate containing isocyanurate groups. Also known are polyisocyanates containing urethane, biuret or urea groups, their isocyanate groups again being blocked.

The disadvantage of these systems lies in the elimination of blocking agent during the thermal crosslinking reaction. Since, consequently, the blocking agent may be emitted into the environment, it is necessary on ecological and industrial hygiene grounds to take special precautions to clean the outgoing air and/or to recover the blocking agent. Moreover, the reactivity of the crosslinkers is low. Curing temperatures above 170° C. are required.

Both disadvantages—emission of blocking agent and curing at high temperatures—can be removed by using powder coating materials which are cured not thermally but instead by means of radiation. Radiation curable powder coating materials of this kind are known and are described in, for example, U.S. Pat. No. 3,485,732, EP 0407826, EP 0636669, WO 99/14254, U.S. Pat. Nos. 3,974,303, 5,639,560 and EP 0934359. Two-component, radiation curable powder coating materials based on an unsaturated polyester and a vinyl ether. The coatings produced from them are unsuitable for outdoor use due to their severe yellowing.

U.S. Pat. No. 3,974,303 describes thermoplastic resins containing from 0.5 to 3.5 polymerizable unsaturated groups per 1,000 g molecular weight. The polyurethanes described (see Example 1), however, are not weather-stable and are of poor flexibility owing to the absence of polyester groups and the low chain length.

U.S. Pat. No. 5,639,560 describes radiation curable powder compositions comprising special crystalline polyesters, additionally containing methacrylic end groups, as binders. These powder compositions optionally comprise ethylenically unsaturated oligomers, including urethane acrylates, in minor amounts, preferably up to 10 percent by weight. The radiation curable powder coating formulations presented in this patent, however, have significant disadvantages. They can be ground only at minus 80° C. and, in general, the resultant coatings are either not stable to outdoor weathering or not flexible. A particularly serious disadvantage is that of the very low pendulum hardness (according to König) of below 120 s.

EP 0934359 describes powderous radiation curable mixtures of amorphous and crystalline polyesters containing terminal methacrylate groups. The powder coatings produced from them possess a higher glass transition temperature than the crystalline methacrylates of U.S. Pat. No. 5,639,560. However, cooling is still required for their grinding. Moreover, the hardness and adhesion of corresponding coatings are no more than satisfactory.

SUMMARY OF THE INVENTION

It is an object of the present invention to provide radiation curable powder coating compositions which are stable when stored at 35° C. and which also, after curing of the corresponding films, lead to coatings combining hardness with flexibility and stability to outdoor weathering.

It is another object of the present invention to provide coatings that are highly transparent and coatings that are opaque.

It is yet another object of the present invention to provide the powder coating materials that can be ground with little or no refrigerant.

This and other objects have been achieved by the present invention the first embodiment of which includes a radiation curable powder coating composition, comprising:

I. a binder comprising
   A) 60–90% by weight of at least one amorphous urethane acrylate; and
   B) 10–40% by weight of at least one crystalline urethane acrylate;
   wherein a Tg of a mixture of A) and B) is at least 35° C.; and
II. an auxiliary and an additive, excluding an UV initiator.

In another embodiment, the present invention includes a process for producing a radiation curable powder coating composition, comprising:

admixing in a heatable kneading device at a temperature of between 120° C. and 130° C.
   A) 60–90% by weight of at least one amorphous urethane acrylate;
   B) 10–40% by weight of at least one crystalline urethane acrylate; and
   C) an auxiliary and an additive, excluding an UV initiator;
   wherein a Tg of a mixture of A) and B) is at least 35° C.

In a further embodiment the present invention includes a coating obtained by the above process.

DETAILED DESCRIPTION OF THE INVENTION

Surprisingly the above objects have been achieved using a radiation curable powder coating composition comprising as a binder a mixture of at least one amorphous urethane acrylate and at least one crystalline urethane acrylate, the mixture having a glass transition point (Tg) of at least 35° C.

The invention provides a radiation curable powder coating composition, comprising:

I. a binder comprising
   A) 60–90% by weight of at least one amorphous urethane acrylate; and
   B) 10–40% by weight of at least one crystalline urethane acrylate;
   the Tg of the mixture of A and B being at least 35° C.; and
II. auxiliaries and additives, excluding UV initiators.

The invention further provides for the use of the above composition for producing radiation curable powder coating compositions.

The invention likewise provides a process for producing the above radiation curable powder coating composition while observing an upper temperature limit of between 120° C. and 130° C., in heatable kneading devices, particularly extruders.

The invention also provides a process for producing coatings of high (at least 80%) or low transparency (lower than 10%) by using the above radiation curable powder coating compositions.

Urethane acrylates for the purposes of this invention comprise a hydroxyl-containing polyester to which urethane groups and acrylate groups are attached by reaction with polyisocyanates and acrylate-containing alcohols.

A. The amorphous urethane acrylates of the present invention are prepared from amorphous hydroxyl-containing polyesters (A1) having a Tg of 35–80° C. by reaction with polyisocyanates (A2) and a compound containing both at least one alcohol group and at least one polymerizable acrylate group (A3). They contain both urethane groups and terminal acrylate groups. The Tg of the hydroxyl-containing polyester (A1) includes all values and subvalues therebetween, especially including 40, 45, 50, 55, 60, 65, 70 and 75° C.

A1. Amorphous hydroxyl-containing polyesters having a Tg of 35–80° C. are prepared by polycondensation of appropriate dicarboxylic acids and diols. Condensation takes place conventionally in an inert gas atmosphere at temperatures from 100 to 260° C., preferably from 130 to 220° C., in the melt or in an azeotropic procedure, as described, for example, in Methoden der Organischen Chemie (Houben-Weyl), Volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961. The temperature during the condensation includes all values and subvalues therebetween, especially including 120, 140, 160, 180, 200, 220 and 240° C. The carboxylic acids preferred for preparing polyesters may be aliphatic, cycloaliphatic, aromatic and/or heterocyclic in nature and may if desired be substituted by halogen atoms and/or unsaturated. Examples thereof include the following: succinic, adipic, suberic, azelaic, sebacic, phthalic, terephthalic, isophthalic, trimellitic, pyromellitic, tetra hydrophthalic, hexahydrophthalic, hexahydroterephthalic, dichlorophthalic, tetrachlorophthalic, endomethylene-tetrahydrophthalic, and glutaric acid, 1,4-cyclohexanedicarboxylic acid, and—where available—their anhydrides or esters. Particularly preferred are isophthalic acid, terephthalic acid, hexahydroterephthalic acid, and 1,4-cyclohexanedicarboxylic acid.

Examples of preferred polyols include monoethylene glycol, 1,2- and 1,3-propylene glycol, 1,4- and 2,3-butylene glycol, di-p-hydroxyethylbutanediol, 1,5-pentanediol, 1,6-hexanediol, 1,8-octanediol, decanediol, dodecanediol, neopentyl glycol, cyclohexanediol, 3(4),8(9) bis (hydroxymethyl)tricyclo[5.2.1.0$^{2,6}$]decane (dicidol), 1,4-bis (hydroxymethyl)cyclohexane, 2,2-bis(4-hydroxycyclohexyl)propane, 2,2-bis[4-([i-hydroxyethoxy) phenyl]propane, 2-methylpropane1,3-diol, 2-methylpentane-1,5-diol, 2,2,4-(2,4,4)-trimethylhexane-1, 6-diol, glycerol, trimethylolpropane, trimethylolethane, hexane-1,2,6-triol, butane-1 2,4-triol, tris([3-hydroxyethyl)-isocyanurate, pentaerythritol, mannitol, and sorbitol, and also diethylene glycol, triethylene glycol, tetraethylene glycol, dipropylene glycol, polypropylene glycols, polybutylene glycols, xylylene glycol, and neopentyl glycol hydroxypivalate. Particular preference is given to monoethylene glycol, neopentyl glycol, dicidol, cyclohexanedimethanol, trimethylolpropane, and glycerol.

Amorphous polyesters thus prepared have an OH number of 15–150 mg KOH/g, a Tg of 35–80° C., and an acid number of <5 mg KOH/g. It is also possible to use mixtures of amorphous polyesters. The OH number includes all values and subvalues therebetween, especially including 20, 30, 40, 50, 60, 70, 80, 90, 100, 110, 120, 130 and 140 mg KOH/g. The Tg includes all values and subvalues therebetween, especially including 40, 45, 50, 55, 60, 65, 70 and 75° C.

A2. Preferred polyisocyanates for the amorphous urethane acrylates of the present invention are diisocyanates of aliphatic, (cyclo)aliphatic or cycloaliphatic structure. Particularly preferred examples of the polyisocyanates are 2-methylpentamethylene-1,5-diisocyanate, hexamethylene diisocyanate, trimethylhexamethylene 1,6-diisocyanate, especially the 2,2,4- and 2,4,4-isomer and technical-grade mixtures of both isomers, 4,4'-methylenebis(cyclohexyl isocyanate), norbornane diisocyanate, and 3,3,5-trimethyl-1-isocyanato-3-isocyanatomethylcyclohexane (IPDI). Likewise highly suitable in addition are polyisocyanates obtainable by reacting polyisocyanates with themselves by way of isocyanate groups, such as isocyanurates, formed by reaction of three isocyanate groups. The polyisocyanates may likewise contain biuret or allophanate groups. IPDI is especially preferred.

A3. Preferred polymerizable compounds containing at least one free OH group and one polymerizable acrylate group include, for example, hydroxyethyl acrylate (HEA), hydroxypropyl acrylate, and glycerol diacrylate. Hydroxyethyl acrylate (HEA) is particularly preferred.

For preparing the amorphous urethane acrylate A from the amorphous OH-containing polyesters A1, polyisocyanates A2, and A3, the polyisocyanate is introduced as an initial charge, DBTL as catalyst and IONOL CP (Shell) as polymerization inhibitor are added, and the polyester is added in an NCO:OH ratio of 2.5–1.5:1. After the end of the addition, the reaction is completed at 100–140° C. The NCO:OH ratio includes all values and subvalues therebetween, especially including 2.4:1, 2.3:1, 2.2:1, 2.1:1, 2.0:1, 1.9:1, 1.8:1 1.7:1 and 1.6:1. The reaction temperature for completion of the reaction includes all values and subvalues therebetween, especially including 105, 110, 115, 120, 125, 130 and 135° C. Thereafter, component A3, e.g., hydroxyethyl acrylate, in a residual-NCO:OH ratio of 1.0–1.1:1 is added to the reaction product and the reaction is completed at 80–140° C. so as to give an NCO content of less than 0.1%. The residual NCO:OH includes all values and subvalues therebetween, especially including 1.01:1, 1.02:1, 1.03:1, 1.04:1, 1.05:1, 1.06:1, 1.07:1, 1.08:1 and 1.09:1. The reaction temperature for completion of the reaction includes all values and subvalues therebetween, especially including 85, 90, 95, 100, 105, 110, 115, 120, 125, 130, and 135° C. Also possible is a prior reaction of a polyisocyanate, e.g. IPDI, with component A3 and the addition of this NCO-containing precursor to the hydroxyl-containing polyester.

B. The crystalline urethane acrylates of the invention are prepared by reacting crystalline hydroxyl-containing polyesters (B1) with polyisocyanates (B2) and a component A3. Especially suitable as A3 is hydroxyethyl acrylate (HEA). They contain both urethane groups and terminal acrylate groups.

B1. Crystalline hydroxyl-containing polyesters are prepared by polycondensation as already described for amorphous polyesters under A1. For this purpose an acid component, composed of 80–100 mol %, preferably 85–95 and most preferably 85–90 mol % of a saturated linear aliphatic or cycloaliphatic dicarboxylic acid having 4–14 carbon atoms and 0–20 mol %, preferably 5–15 and most preferably 5–10 mol % of another aliphatic or cycloaliphatic or aromatic dicarboxylic or polycarboxylic acid is reacted with an alcohol component composed of 80–100 mol %, preferably 85–95 and most preferably 85–90 mol % of a linear aliphatic diol having 2–15 carbon atoms and 0–20 mol %, preferably 5–15 and most preferably 5–10 mol % of another aliphatic or cycloaliphatic diol or polyol having 2–15 carbon atoms. The crystalline hydroxyl-containing polyesters thus prepared have an OH number of 15–150 mg KOH/g, an acid number <5 mg KOH/g and a melting point of 40–130° C. The OH number of the crystalline hydroxyl-containing polyester includes all values and subvalues therebetween, especially including 20, 30, 40, 50, 60, 70, 80, 90, 100, 110, 120, 130 and 140 mg KOH/g. The melting point includes all values and subvalues therebetween, especially including 50, 60, 70, 80, 90, 100, 110 and 120° C.

Preferred carboxylic acids for preparing crystalline polyesters are succinic, adipic, suberic, azelaic, sebacic, dodecanedioic, tetrahydrophthalic, hexahydrophthalic, hexahydroterephthalic, endomethylenetetrahydrophthalic, isophthalic, terephthalic, 1,4-cyclohexanedicarboxylic, and glutaric acids, and—where available—their anhydrides or esters. Especially suitable are succinic acid, adipic acid, sebacic acid and dodecanedioic acid.

Preferred polyols include the following diols: ethylene glycol, propane-1,2-diol and propane-1,3-diol, 2,2-dimethylpropane-1,3-diol, butane-1,4-diol, pentane-1,5-diol, hexane-1,6-diol, 2-methylpentane-1,5-diol, 2,2,4-trimethylhexane-1,6-diol, 2,4,4-trimethylhexane-1,6-diol, heptane-1,7-diol, decane-1,10-diol, dodecane-1,12-diol, 9,10-octadecene-1,12-diol, octadecane-1,18-diol, 2,4-dimethyl-2-propylheptane-1,3-diol, butene-1,4-diol, butyne-1,4-diol, diethylene glycol, triethylene glycol, tetraethylene glycol, trans- and cis-1,4-cyclohexanedimethanol; the triols glycerol, hexane-1,2,6-triol, 1,1,1-trimethylolpropane, and 1,1,1-trimethylolethane; and the tetraol pentaerythritol.

B2. For preparing the crystalline urethane acrylates of the present invention it is preferred to use, as polyisocyanates, diisocyanates of aliphatic, (cyclo)aliphatic or cycloaliphatic structure. Representative examples of the polyisocyanates are 2-methylpentamethylene 1,5-diisocyanate, hexamethylene diisocyanate, trimethylhexamethylene 1,6-diisocyanate, preferably the 2,2,4- and 2,4,4-isomer and technical-grade mixtures of both isomers, 4,4'-methylenebis(cyclohexyl isocyanate), norbornane diisocyanate, and 3,3,5-trimethyl-1-isocyanato-3-isocyanatomethylcyclohexane (IPDI). In addition, likewise highly suitable are polyisocyanates obtainable by reacting polyisocyanates with themselves by way of isocyanate groups, such as isocyanurates, formed by reaction of three isocyanate groups. The polyisocyanates may likewise contain biuret or allophanate groups. IPDI is especially preferred.

B3. The polymerizable compounds B3 are identical with component A3.

For preparing the urethane acrylates B of the invention from crystalline OH-containing polyesters B1, polyisocyanates B2, and B3, the polyisocyanate is introduced as an initial charge, DBTL as catalyst and IONOL CP (Shell) as polymerization inhibitor are added, and the polyester is added in an NCO:OH ratio of 2.5–1.5:1. The NCO:OH ratio includes all values and subvalues therebetween, especially including 2.4:1, 2.3:1, 2.2:1, 2.1:1, 2.0:1, 1.9:1, 1.8:1, 1.7:1 and 1.6.1. After the end of the addition, the reaction is completed at 70–130° C. The temperature for completion of the reaction includes all values and subvalues therebetween, especially including 80, 90, 100, 110 and 120° C. Thereafter, component B3, e.g., hydroxyethyl acrylate, in a residual-NCO:OH ratio of 1.0–1.1:1 is added to the reaction product and the reaction is completed at 70–130° C. so as to give an NCO content of less than 0.1%. The residual NCO:OH ratio includes all values and subvalues therebetween, especially including 1.01, 1.02, 1.03, 1.04, 1.05, 1.06, 1.07, 1.08 and 1.09. The temperature for completion of the reaction includes all values and subvalues therebetween, especially including 80, 90, 100, 110 and 120° C.

Amorphous and crystalline urethane acrylates are mixed in a ratio of amorphous to crystalline of 60:40 to 90:10% by weight, so that the end product has a Tg of at least 35° C. The mixing ratio of amorphous to crystalline urethane acrylate includes all values and subvalues therebetween, especially including 65:35, 70:30, 75:25 and 80:20% by weight. It is also possible to mix the amorphous and crystalline starting polyesters and then to react said mixture with polyisocyanates and acrylate-containing alcohols.

For the radiation curing of the powder coating composition of the invention, accelerated electron beams are preferred. The electron beams generate free radicals from the powder coating composition, in a number which ensures extremely rapid polymerization of the reactive acrylate groups. It is preferred to use radiation doses of from 5 to 15 Mrad. The radiation dose includes all values and subvalues therebetween, especially including 6, 7, 8, 9, 10, 11, 12, 13 and 14 Mrad.

The use of initiators, e.g., thioxanthones, phosphine oxides, metallocenes, tertiary aminobenzenes or tertiary aminobenzophenones, which break down into free radicals on exposure to visible light is likewise possible.

Optional additives are acrylate or methacrylate compounds, such as the triacrylate of tris(2-hydroxyethyl) isocyanurate (SR 386, Sartomer), and adhesion promoters, which may be used in minor fractions of 0–20% by weight in order to modify the coating properties. The amount of adhesion promoter includes all values and subvalues therebetween, especially including 5, 10 and 15% by weight.

Further additives customary in the case of powder coating materials are leveling agents, light stabilizers, and devolatilizers. These may be used at 0–5% by weight. The amount of these additional additives includes all values and subvalues therebetween, especially including 1, 2, 3 and 4% by weight. It is preferred to use pigments and extenders, e.g., metal oxides such as titanium dioxide and metal hydroxides, sulfates, sulfides, carbonates, silicates, talc, carbon black, etc., in weight fractions of 0–30% by weight. The amount of the pigments and extenders includes all values and subvalues therebetween, especially including 5, 10, 15, 20 and 25% by weight.

In order to prepare the ready-to-use powder coating composition the ingredients are mixed. Homogenization of the ingredients may take place in suitable apparatus, such as heatable kneading devices, for example, but preferably by extrusion, with recommended upper temperature limits of 120–130° C. The temperature includes all values and subvalues therebetween, especially including 122, 123, 126 and 128° C. Following cooling to room temperature and appropriate size reduction, the extrudate is ground to the ready-to-spray powder without addition of refrigerants. Application of the ready-to-spray powder to appropriate substrates may take place in accordance with the known methods, such as by electrostatic or tribostatic powder spraying, fluidized bed sintering or electrostatic fluid-bed sintering, for example. Examples of preferred substrates include untreated and pretreated metallic substrates, wood, wood materials, plastics, glass, and paper.

The coatings produced from the powder coating compositions of the invention may be formulated to range from highly transparent to opaque.

The invention accordingly further provides for the use of the radiation curable powder coating compositions for producing coatings having a high transparency of >90%, preferably >95% and most preferably >99% or a low transparency of <10%, preferably <5% and most preferably <1%.

Having generally described this invention, a further understanding can be obtained by reference to certain specific examples which are provided herein for purposes of illustration only, and are not intended to be limiting unless otherwise specified.

EXAMPLES

1. General Preparation Procedure for Hydroxyl-containing Polyesters

Acid components and alcohol components are admixed with 0.2 percent by mass of n-butyltin trioctanoate and heated at 190° C. under nitrogen and with stirring in an apparatus provided with a distillation column. As water is separated out, this temperature is slowly raised to 230° C. After about 98% of the theoretical amount of water has been removed by distillation, the product is cooled and tested for OH number (OHN in mg KOH/g) and acid number (AN in mg KOH/g).

In this way, four polyesters were prepared:

A1: amorphous polyester composed of IPA 100%, MEG 20% and NPG 80%, HN 42 mg KOH/g, Tg 48° C.

A2: amorphous polyester composed of IPA 100%, MEG 20% and DCD 80%, OHN 40 mg KOH/g, Tg 75° C.

B2: crystalline polyester composed of DDA 100%, MEG 100%, OHN 31 mg KOH/g, m.p.: 81° C.

B2: crystalline polyester composed of SSA 100%, 1,4-BD 100%, OHN 31 mg KOH/g, m.p.: 113° C.

SSA: succinic anhydride, DDA: dodecanedioic acid, IPA: isophthalic acid, 1,4-BD: 1,4-butanediol, MEG: monoethylene glycol, NPG: neopentyl glycol, DCD: dicidol 2. Preparation of the Amorphous Urethane Acrylate A1U 111.2 g of the polyester A1 (OHN 42) were melted and added in portions at 120° C. with vigorous stirring to a mixture of 23.7 g of IPDI, 0.3 g of IONOL CP and 0.3 g of DBTL. After 30 minutes of reaction, 14.9 g of hydroxyethyl acrylate were additionally added dropwise. After a further 30 minutes of stirring, the NCO content was below 0.1% and the hot reaction mixture was poured from the flask onto a sheet. As soon as the reaction mass had solidified and cooled, it was mechanically size-reduced and ground. The Tg of this product was 41° C.

3. Preparation of the Amorphous Urethane Acrylate A2U 37.7 g of the polyester A2 (OHN 40) were melted and added in portions at 140° C. with vigorous stirring to a mixture of 7.5 g of IPDI, 0.1 g of IONOL CP and 0.1 g of DBTL. After 30 minutes of reaction, 4.7 g of hydroxyethyl acrylate, were additionally added dropwise. After a further 30 minutes of stirring, the NCO content was below 0.1% and the hot reaction mixture was poured from the flask onto a sheet. As soon as the reaction mass had solidified and cooled, it is mechanically size-reduced and ground. The Tg of this product was 62° C.

4. Preparation of the Crystalline Urethane Acrylate B1 U 103.8 g of the polyester 131 (OHN 31) were melted and added in portions at 90° C. with vigorous stirring to a mixture of 16.1 g of IPDI, 0.1 g of IONOL CP and 0.1 g of DBTL. After 30 minutes of reaction, 10.1 g of hydroxyethyl acrylate were additionally added dropwise. After a further 30 minutes of stirring, the NCO content was below 0.1 and the hot reaction mixture was poured from the flask onto a sheet. As soon as the reaction mass had solidified and cooled, it was mechanically size-reduced and ground. The melting point of this product was 80° C.

5. Preparation of the Crystalline Urethane Acrylate BZU 103.8 g of the polyester B2 (OHN 31) were melted and added in portions at 90° C. with vigorous stirring to a mixture of 16.1 g of IPDI, 0.1 g of IONOL CP and 0.1 g of DBTL. After 30 minutes of reaction, 10.1 g of hydroxyethyl acrylate were additionally added dropwise. After a further 30 minutes of stirring, the NCO content was below 0.1 and the hot reaction mixture was poured from the flask onto a sheet. As soon as the reaction mass had solidified and cooled, it was mechanically size-reduced and ground. The melting point of this product was 109° C.

6. Preparation of Polymers According to the Present and Powder Coating Compositions and of the Comparative Experiments The three constituents A1 U, A2U and BU were mixed in the appropriate weight ratio and 100 parts of this mixture were admixed with 0.5 part of BYK 361 (leveling agent, BYK Chemie), 0.5 part of benzoin (devolatilizer, Aldrich) and 1 part of EBECRYL 170 (adhesion promoter, UCB). The size-reduced ingredients were intimately mixed in an edge runner mill and then homogenized in an extruder at not more than 130° C. After cooling, the extrudate was fractionated and ground to a particle size <100~Lm using a pinned disk mill, with (in the case of the comparative experiments) and without (in the case of the inventive example) the addition of refrigerants (liquid nitrogen or dry ice). The powder thus prepared was applied using an electrostatic powder spraying unit at 60 kV to degreased and optionally pretreated iron panels. It was then melted under IR irradiation and cured by means of electron beams (15 Mrad).

For Comparative Example Z the following formulation was used:

300 g UVECOAT 2100 (UCB)

86 g UVECOAT 9010 (UCB)

8 g IRGACURE 184 (CIBA)

4 g RESIFLOW PV 5 (Worlee)

2 g WORLEE Add 900 (Worlee)

The compositions and results are summarized in Table 1:

TABLE 1

| Experiment | A1U | A2U | B1U | B2U | Total Tg [° C.] | Grindable without Refrig.[1] | HK[2] [sec] | EC[3] [mm] | B1[4] [in* lb] | SS[5] | Opacity[6] |
|---|---|---|---|---|---|---|---|---|---|---|---|
| 1 | 56 | 24 | 20 | — | 43 | Yes | 176 | >10 | 80 | >7d | 82 |
| 2 | 56 | 24 | — | 20 | 45 | Yes | 194 | >10 | >80 | >7d | 12 |
| Comp. X | | | 100 | 100 | −80 | No | 70 | >10 | >80 | <1d | — |

TABLE 1-continued

| Experiment | A1U | A2U | B1U | B2U | Total Tg [° C.] | Grindable without Refrig.[1] | HK[2] [sec] | EC[3] [mm] | B1[4] [in* lb] | SS[5] | Opacity[6] |
|---|---|---|---|---|---|---|---|---|---|---|---|
| Comp. Y | 80 | | 20 | 20 | 32 | No | 135 | 10 | >80 | 1d | — |
| Comp Z | | | | | | No | 88 | 6.4 | 50 | | — |

[1]Grindability without use of refrigerant.
[2]Hardness according to König (DIN 53 157).
[3]Erichsen cupping (DIN 53 156).
[4]Ball impact, direct (DIN EN ISO 6272).
[5]Storage stability at 35° C. (test for blocking resistance of the powder).
[6]Transparency at a wavelength of 500 nm.

Only Experiments 1 and 2 according to the present invention were grindable without addition of refrigerant and, moreover, exhibited a combination of high hardness, flexibility, and storage stability in the coating. All Comparative Examples (Comp. X, Y and Z) had deficiencies in at least one of these aspects. Additionally, by using the powder coating compositions 1 and 2 of the present invention it was possible to produce coatings having very different light transmittances.

German patent application 10163827.2 filed Dec. 22, 2001, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. A radiation curable powder coating composition, comprising:
   I. a binder comprising
      A) 60–90% by weight of at least one amorphous urethane acrylate; and
      B) 10–40% by weight of at least one crystalline urethane acrylate;
      wherein the Tg of a mixture of A) and B) is at least 35° C.,
      the amount of each of A and B being based on a sum of A and B; and
   II. an auxiliary and an additive, excluding an UV initiator.

2. The radiation curable powder coating composition as claimed in claim 1, wherein the amorphous urethane acrylate A) is synthesized by reacting the following components:
   A1) at least one amorphous hydroxyl-containing polyester having a g of 35–80° C.,
   A2) at least one polyisocyanate; and
   A3) at least one compound having at least one alcohol group and at least one polymerizable acrylate group.

3. The radiation curable powder coating composition as claimed in claim 2, wherein the polyester A1 is prepared by polymerizing
   a) at least one monomeric dicarboxylic acid selected from the group consisting of isopbthalic acid, terephthalic acid, hexahydroterephthalic acid, and 1,4-cyclohexanedicarboxylic acid; and
   b) at least one monomeric polyol selected from the group consisting of monoethylene glycol, butanediol, hexanediol, neopentyl glycol, dicidol, cyclohexanedimethanol, trimethylolpropane and glycerol.

4. The radiation curable powder coating composition as claimed in claim 2, wherein a) said polyisocyanate A2 is selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexan, norbornane diisocyanate and a mixture thereof; or b) said polyisocyanate A2 is a diisocyanate, an isocyanurate, an allophanate or a biuret of a compound selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof.

5. The radiation curable powder coating composition as claimed in claim 2, wherein said component A3 is hydroxyethyl acrylate.

6. The radiation curable powder coating composition as claimed in claim 2, wherein said component B3 is hydroxyethyl acrylate.

7. The radiation curable powder coating composition as claimed in claim 1, wherein the crystalline urethane acrylate B is synthesized by reacting the following components:
   B1) at least one crystalline hydroxyl-containing polyester,
   B2) at least one polyisocyanate;
   B3) at least one compound having at least one alcohol group and at least one polymerizable acrylate group.

8. The radiation curable powder coating composition of claim 7, wherein said polyester B1 is prepared by polymerizing
   a) at least one monomeric dicarboxylic acid selected from the group consisting of dodecanoic acid, adipic acid, succinic acid, sebacic acid, isophthalic acid, terephthalic acid, hexahydroterephthalic acid and 1,4-cyclohexanedicarboxylic acid; and
   b) at least one monomeric polyol selected from the group consisting of monoethylene glycol, butanediol, hexanediol, neopentyl glycol, cyclohexanedimethanol, glycerol and trimethylolpropane.

9. The radiation curable powder coating composition as claimed in claim 7, wherein
   a) polyisocyanate B2 is selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof, or
   b) polyisocyanate B2 is a diisocyanate, an isocyanurate, an allophanate or a biuret of a compound selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof.

10. The radiation curable powder coating composition as claimed in claim 1, wherein said auxiliary or said additive is a leveling agent, a light stabilizer, a devolatilizer, a pigment, a filler, an adhesion promoter, an acrylate-containing compound, a methacrylate-containing compound or mixtures thereof.

11. A process for producing a radiation curable powder composition, comprising:
   admixing in a heatable kneading device at a temperature ranging from 120° C. and 130° C.
   A) 60–90% by weight of at least one amorphous urethane acrylate;
   B) 10–40% by weight of at least one crystalline urethane acrylate, the amount of each of A and B being based on a sum of A and B; and
   C) an auxiliary and an additive, excluding a UV initiator; wherein the Tg of a mixture of A) and B) is at least 35° C.

12. The process as claimed in claim 11, wherein the crystalline urethane acrylate A) is synthesized by reacting the following components:
   A1) at least one amorphous hydroxyl-containing polyester having a Tg of 35–80° C.,
   A2) at least one polyisocyanate,
   A3) at least one compound having at least one alcohol group and at least one polymerizable acrylate group.

13. The process as claimed in claim 12, wherein the polyester A1 is prepared by polymerizing
   a) at least one monomeric dicarboxylic acid selected from the group consisting of isophthalic acid, terephthalic acid, hexahydroterephthalic acid, and 1,4-cyclohexanedicarboxylic acid; and
   b) at least one monomeric polyol selected from the group consisting of monoethylene glycol, butanediol, hexanediol, neopentyl glycol, dicidol, cyclohexanedimethanol, trimethylolpropane and glycerol.

14. The process as claimed in claim 12, wherein
   a) said polyisocyanate A2 is selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof, or
   b) polyisocyanate A2 is a diisocyanate, an isocyanurate, an allophanate or a biuret of a compound selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof.

15. The process as claimed in claim 12, wherein said component A3 is hydroxyethyl acrylate.

16. The process as claimed in claim 11, wherein the crystalline urethane acrylate B) is synthesized by reacting the following components:
   A1) at least one crystalline hydroxyl-containing polyester,
   A2) at least one polyisocyanate,
   A3) at least one compound having at least one alcohol group and at least one polymerizable acrylate group.

17. The process as claimed in claim 16, wherein said polyester B1 is prepared by polymerizing
   a) at least one monomeric dicarboxylic acid selected from the group consisting of dodecanoic acid, adipic acid, succinic acid, sebacic acid, isophthalic acid, terephthalic acid, hexahydroterephthalic acid and 1,4-cyclohexanedicarboxylic acid; and
   b) at least one monomeric polyol selected from the group consisting of monoethylene glycol, butanediol, hexanediol, neopentyl glycol, cyclohexanedimethanol, glycerol and trimethylolpropane.

18. The process as claimed in claim 17, wherein
   a) polyisocyanate B2 is selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof, or
   b) polyisocyanate B2 is a diisocyanate, an isocyanurate, an allophanate or a biuret of a compound selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof.

19. The process as claimed in claim 17, wherein said component B3 is hydroxyethyl acrylate.

20. The process as claimed in claim 11, wherein said auxiliary or said additive is a leveling agent, a light stabilizer, a devolatilizer, a pigment, a filler, an adhesion promoter, an acrylate-containing compound, a methacrylate-containing compound or mixtures thereof.

21. A process for producing a coating of the radiation curable powder coating composition according to claim 1, comprising:
   coating a substrate with said radiation curable powder coating composition to obtain a coated substrate; and
   curing said coated substrate.

22. The method according to claim 21, wherein said curing is conducted by subjecting the coated substrate to an accelerated electron beam.

23. A coating obtained by the process according to claim 21.

24. The coating according to claim 23, which has a transparency of at least 90%.

25. The coating according to claim 23, which has a transparency of less than 10%.

* * * * *

UNITED STATES PATENT AND TRADEMARK OFFICE
CERTIFICATE OF CORRECTION

PATENT NO.     : 6,825,240 B2
DATED          : November 30, 2004
INVENTOR(S)    : Wenning et al.

It is certified that error appears in the above-identified patent and that said Letters Patent is hereby corrected as shown below:

<u>Title page,</u>
Items [45] and [*] Notice, should read as follows:
-- [45] Date of Patent: Nov. 30, 2004

[*] Notice: Subject to any disclaimer, the term of this
patent is extended or adjusted under 35
U.S.C. 154(b) by 11 days.

This patent is subject to a terminal disclaimer. --

Signed and Sealed this

First Day of March, 2005

JON W. DUDAS
*Director of the United States Patent and Trademark Office*